United States Patent
Matsunami et al.

(10) Patent No.: US 11,077,714 B2
(45) Date of Patent: Aug. 3, 2021

(54) TIRE AND THREE-WHEELED VEHICLE WITH THE SAME

(71) Applicant: Sumitomo Rubber Industries, Ltd., Kobe (JP)

(72) Inventors: Toshiyuki Matsunami, Kobe (JP); Yumiko Yoshida, Kobe (JP); Satoshi Matsunaga, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 883 days.

(21) Appl. No.: 15/803,139

(22) Filed: Nov. 3, 2017

(65) Prior Publication Data

US 2018/0126789 A1 May 10, 2018

(30) Foreign Application Priority Data

Nov. 4, 2016 (JP) .............................. JP2016-216503

(51) Int. Cl.
 *B60C 11/03* (2006.01)
 *B60C 11/00* (2006.01)
 (Continued)

(52) U.S. Cl.
 CPC ...... B60C 11/0083 (2013.01); B60C 11/0302 (2013.01); B60C 11/032 (2013.01);
 (Continued)

(58) Field of Classification Search
 CPC . B60C 11/033; B60C 11/0083; B60C 11/032; B60C 11/0302; B60C 11/24; B60C 2011/0025
 See application file for complete search history.

(56) References Cited

U.S. PATENT DOCUMENTS

| | | | | |
|---|---|---|---|---|
| 5,441,093 A | * | 8/1995 | Shirasyouji | B60C 9/2204 152/454 |
| 2006/0219342 A1 | * | 10/2006 | Steinbach | B60C 11/0302 152/209.11 |

(Continued)

FOREIGN PATENT DOCUMENTS

| | | |
|---|---|---|
| CN | 104029567 A | 9/2014 |
| EP | 2492116 A2 | 8/2012 |

(Continued)

OTHER PUBLICATIONS

Machine translation for Japan 2016-159827 (Year: 2020).*
Extended European Search Report, dated Mar. 15, 2018, for European Application No. 17197193.0.

*Primary Examiner* — Steven D Maki
(74) *Attorney, Agent, or Firm* — Birch, Stewart, Kolasch & Birch, LLP

(57) ABSTRACT

A tire includes a tread portion provided with a tread profile which is curved in an arcuate shape in a tire meridian section so that the tread portion includes a crown region contacting with the ground during straight running, and a pair of shoulder regions contacting with the ground during cornering by leaning the tire at a certain camber angle. The crown region has a land ratio of not less than 98%, and the shoulder regions have a land ratio of from 85% to 93%. A three-wheeled vehicle has a pair of front wheels and a single rear wheel on which the tire is mounted.

18 Claims, 2 Drawing Sheets

(51) Int. Cl.
*B60C 11/24* (2006.01)
*B60C 17/00* (2006.01)

(52) U.S. Cl.
CPC ............ *B60C 11/033* (2013.01); *B60C 11/24* (2013.01); *B60C 2011/0025* (2013.01); *B60C 2011/0339* (2013.01); *B60C 2011/0383* (2013.01); *B60C 2017/0081* (2013.01); *B60C 2200/10* (2013.01)

(56) References Cited

U.S. PATENT DOCUMENTS

| | | | |
|---|---|---|---|
| 2011/0132509 A1 | 6/2011 | Kasai | |
| 2012/0103484 A1* | 5/2012 | Ohashi ................ | B60C 11/1281 152/154.2 |
| 2012/0118456 A1* | 5/2012 | Schiavolin .......... | B60C 11/0302 152/209.8 |
| 2015/0035971 A1* | 2/2015 | Bogenschuetz ......... | B60C 11/24 348/128 |
| 2017/0259622 A1 | 9/2017 | Ledieu et al. | |
| 2019/0202236 A1* | 7/2019 | Miyamoto .......... | B60C 11/0058 |
| 2019/0255885 A1* | 8/2019 | Muramatsu ......... | B60C 11/0083 |

FOREIGN PATENT DOCUMENTS

| | | | |
|---|---|---|---|
| JP | 2011-121408 A | | 6/2011 |
| JP | 2016-159827 A | * | 9/2016 |
| WO | WO 2016/079456 A1 | | 5/2016 |

\* cited by examiner

ID VEHICLE

TIRE AND THREE-WHEELED VEHICLE WITH THE SAME

TECHNICAL FIELD

The present invention relates to a tire having an arcuate tread profile and a three-wheeled vehicle comprising the same.

BACKGROUND ART

Heretofore, as a tire for a three-wheeled vehicle which is leaned in a turn, for the purpose of convenience, tires for two-wheeled motorcycles have been used.

Usually, the tires for two-wheeled motorcycles are provided with a tread profile which is arcuate in the tire meridian section. During cornering, a two-wheeled motorcycle is rolled, and the tire is leaned by a camber angle. By the resultant camber thrust and a cornering force, the motorcycle tire generates a lateral force during cornering.

When the tire is leaned at small camber angles, for example, at the time of changing lanes, as the camber thrust is small, the lateral force of the motorcycle tire depends mainly on the cornering force.

The following patent document 1 discloses a motorcycle tire, wherein the tread portion is provided with crown oblique grooves disposed in a tread crown region which contacts with the ground mainly during straight running, and shoulder grooves disposed in a pair of tread shoulder regions which contact with the ground during cornering by leaning at relatively large camber angles.

patent document 1: Japanese Patent Application Publication No. 2011-121408

SUMMARY OF THE INVENTION

Problems to be Resolved by the Invention

In the case of a three-wheeled vehicle having two front wheels and a single rear wheel, during cornering, the rear wheel needs to generate a large lateral force which is comparable with lateral forces generated from the two front wheels.

If the motorcycle tire of the patent document 1 is mounted on the rear wheel of the three-wheeled vehicle, as the rigidity of the tread portion is low, the cornering force becomes insufficient to generate a required large lateral force. Especially, during cornering by leaning at small camber angles, the cornering force becomes insufficient, and the three-wheeled vehicle on the rear wheel of which the two-wheeled motorcycle tire is mounted, is likely affected by undulation of road surfaces.

Further, in the case of the three-wheeled vehicle which is equipped with a steering system for the rear wheel, not for the front wheels, the degree of influence of the rear wheel on the motions of the vehicle becomes relatively large.

For example, during cornering by leaning at small camber angles, there is a possibility that, by the undulation of the road surfaces, the behavior of the rear wheel becomes unstable, and as a result, the behavior of the vehicle becomes unstable.

It is therefore, an object of the present invention to provide a tire and a three-wheeled vehicle with the same, in which behavior of the three-wheeled vehicle during cornering can be stabilized.

According to one aspect of the present invention, a tire comprises a tread portion provided with a tread profile which is curved in an arcuate shape in a tire meridian section so that the tread portion comprises a crown region contacting with the ground during straight running, and a pair of shoulder regions contacting with the ground during cornering by leaning the tire at a certain camber angle, wherein the crown region has a land ratio of not less than 98%, and the shoulder regions have a land ratio of from 85% to 93%.

In a tire meridian section, the tread profile preferably has a radius of curvature of from 45% to 65% of a tread width of the tread portion.

Each of the shoulder regions preferably is a region contacting with the ground during cornering when the camber angle is 10 degrees or more.

A tread rubber disposed in the tread portion to define the ground contacting surface thereof preferably has a loss tangent not less than 0.27 at a temperature of 0 deg. C.

The crown region is preferably provided with at least one crown slot extending straight discontinuously along the tire circumferential direction.

The above-said at least one crown slot is preferably disposed on the tire equator.

The above-said at least one crown slot is preferably provided therein with a tread wear indicator.

According to another aspect of the present invention, a three-wheeled vehicle having a pair of front wheels and a single rear wheel to be leant during cornering, wherein the tire according to the present invention is mounted on the rear wheel.

The three-wheeled vehicle preferably comprises a steering system for changing the direction of the rear wheel according to the traveling direction of the motorcycle during.

Therefore, in the tire according to the present invention, as the land ratio of the crown region is not less than 98%, the rigidity of the tread portion becomes high in the crown region, therefore, it is possible to generate a large cornering force during cornering by leaning at small camber angles, for example, at the time of changing lanes. As a result, the tire is hard to be affected by undulation of the road surfaces during cornering by leaning at small camber angles, and thereby the behavior of the tire becomes stable.

Further, in the three-wheeled vehicle on the single rear wheel of which the tire of the present invention is mounted, as the behavior of the rear wheel is stabilized, the behavior of the vehicle during cornering by leaning at small camber angles becomes stable.

In the tire according to the present invention, as the land ratio of the shoulder region is in a range from 85% to 93%, it is possible to achieve both of the cornering force during cornering and the slide controllability in the event of tire slide in good balance. Therefore, the behavior of the tire during cornering becomes stable.

Further, in the three-wheeled vehicle on the single rear wheel of which the tire of the present invention is mounted, as the behavior of the rear wheel during cornering is stabilized, the behavior of the vehicle becomes stable.

DESCRIPTION OF THE PREFERRED EMBODIMENTS

Embodiments of the present invention will now be described in detail in conjunction with accompanying drawings.

Figure 1:
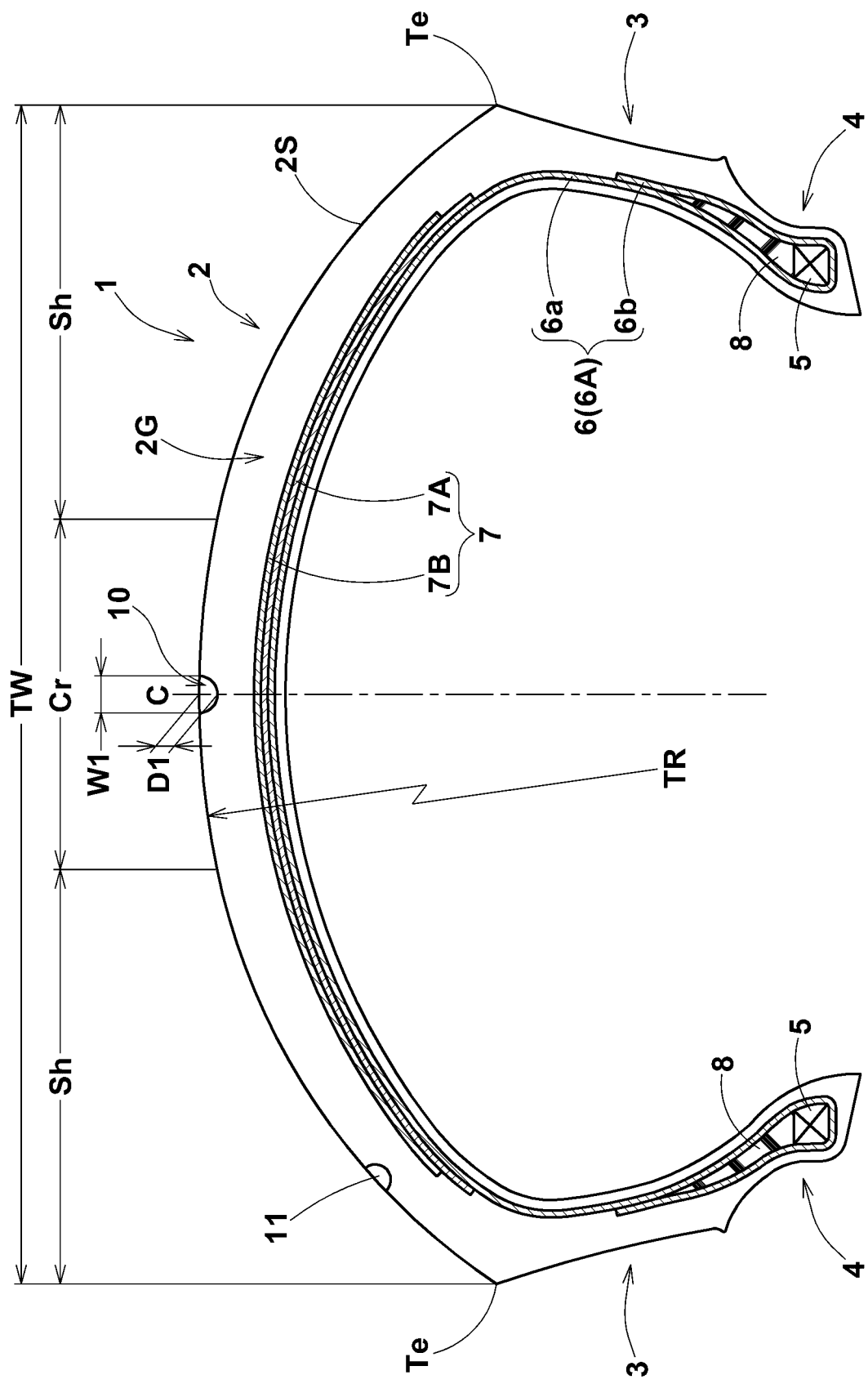
FIG. 1 is a cross sectional view of a tire as an embodiment of the present invention.
Figure 2:
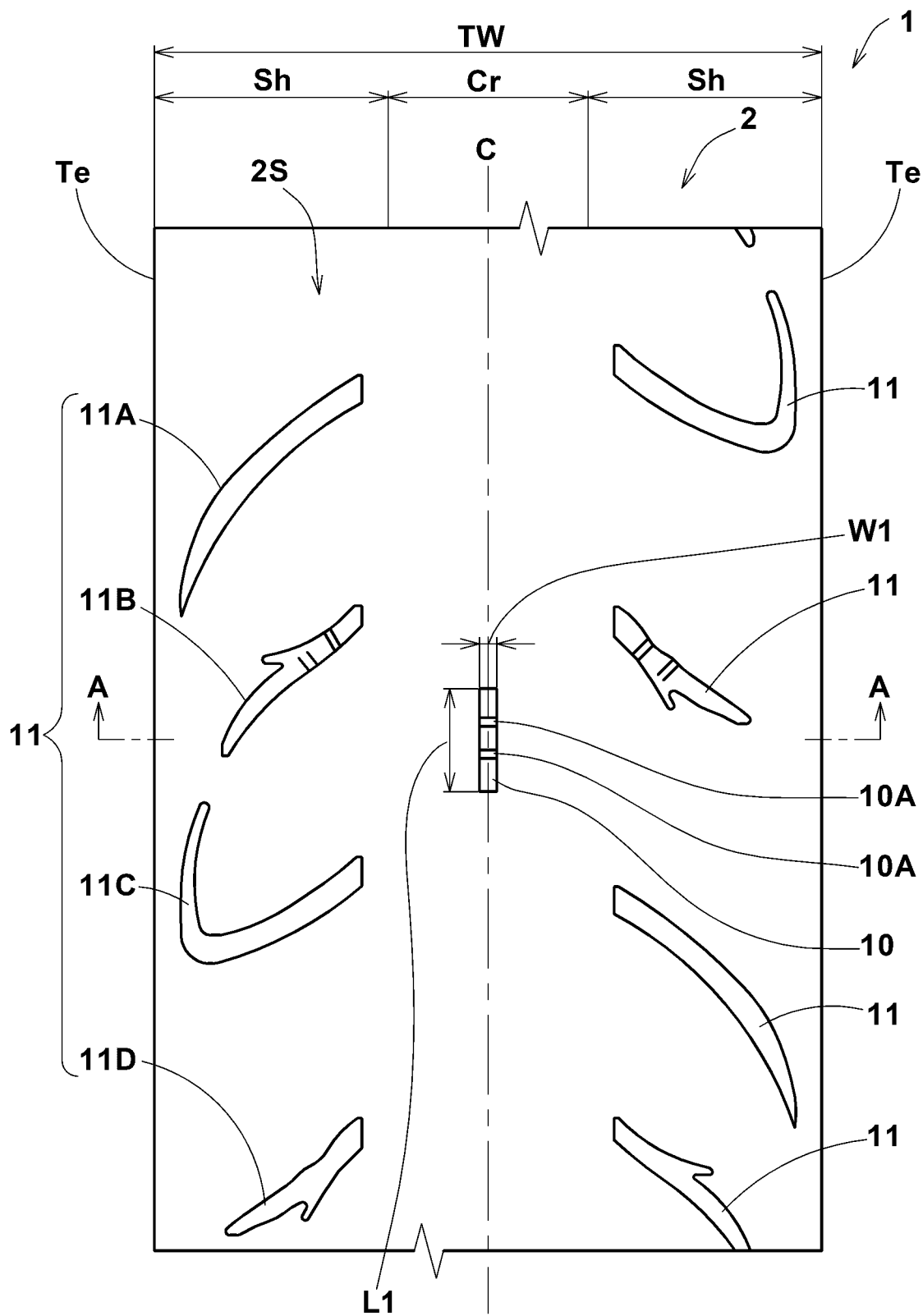
FIG. 2 is a developed partial plan view of the tire showing the tread portion thereof.

FIG. 1 is a cross sectional view of a tire 1 as an embodiment of the present invention in a tire meridian section under a normally inflated unloaded condition taken along line A-A in FIG. 2.

FIG. 2 is a developed partial plan view of the tire 1 showing the tread portion 2 thereof.

The normally inflated unloaded condition is such that the tire is mounted on a standard wheel rim and inflate to a standard pressure but loaded with no tire load.

In this application including specification and claims, various dimensions, positions and the like of the tire refer to those under the normally inflated unloaded condition of the tire unless otherwise noted.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure is the maximum air pressure for the tire specified by the same organization in the Air-pressure/Maximum-load Table or similar list, specifically, the "maximum air pressure" in JATMA, the "Inflation Pressure" in ETRTO, the maximum pressure given in the "Tire Load Limits at Various Cold Inflation Pressures" table in TRA or the like.

The tire 1 according to the present invention is for a three-wheeled vehicle (not shown) with two front wheels and a single rear wheel which is leant during cornering.

In the present embodiment, the tire 1 is designed to be mounted on the rear wheel.

In the present embodiment, the three-wheeled vehicle compresses a steering system for changing the direction of the rear wheel according to the traveling direction of the motorcycle for example during cornering. Such three-wheeled vehicle satisfies both of the stability during cornering and the ability to turn in a small radius in good balance.

AS shown in FIG. 1, the tire 1 comprises
a tread portion 2,
a pair of sidewall portions 3,
a pair of bead portions 4 each with a bead core 5 therein,
a carcass 6 extending between the bead portions through the tread portion and the sidewall portions, and a tread reinforcing layer 7 disposed radially outside the carcass 6 in the tread portion 2.

The carcass 6 in this example is composed of a single ply 6A of cords arranged radially at an angle of preferably 75 to 90 degrees, more preferably 80 to 90 degrees with respect to the tire equator C, and extending between the bead portions through the tread portion and the sidewall portions, and further turned up around the bead core 5 in each of the bead portions so as to form a pair of turned up portions 6b and a main portion 6a therebetween. For the carcass cords, for example, organic fiber cords such as nylon, polyester, rayon and the like are suitably used.

Each of the bead portions 4 is preferably provided between the main portion 6a and turned up portion 6b with a bead apex rubber 8 for example made of a hard rubber compound to reinforce the bead portion 4.

The tread reinforcing layer 7 is composed of one or more plies of reinforcing cords inclined at angles of from 5 to 40 degrees with respect to the tire equator C.

In this example, the tread reinforcing layer 7 is composed two plies, preferably two cross plies 7A and 7B.

For the reinforce cords, for example, steel cords, aramid cords, rayon cords and the like can be suitably used.

The tread portion 2 has a tread profile which is curved convexly toward the radially outside in an arc shape so that a sufficient ground contacting area can be obtained during cornering by leaning at large camber angles, and thereby the tread portion 2 can generate the required camber thrust during cornering.

In the present embodiment, the maximum section width of the tire lies between the tread edges Te of the tread portion 2, namely, the maximum section width equals to the tread width TW.

In the tire meridian section, the tread profile preferably has a radius TR of curvature of from 45% to 65%, more preferably 50% to 60% of the tread width TW.

If the radius TR of curvature is less than 45% of the tread width TW, there is a possibility that a large camber thrust is generated during cornering by leaning at small camber angles, and there is a tendency toward understeer increases.

If the radius TR of curvature is more than 65% of the tread width TW, there is a possibility that the camber thrust becomes insufficient during cornering by leaning at large camber angles, and there is a tendency toward oversteer increases.

In the present embodiment, by setting the radius TR of curvature of the tread portion 2 within the above-mentioned range, the tendency toward understeer or oversteer can be controlled within a suitable range, and the stability of behavior of the tire 1 can be improved.

A tread rubber 2G is disposed radially outside the tread reinforcing layer 7 to define the ground contacting surface 2S of the tread portion 2. For the tread rubber 2G, suitably used is a compound which can generate larger grip force in order to obtain a large lateral force during cornering. From this viewpoint, the loss tangent (tan δ) at 0 deg. C. of the tread rubber 2G is preferably not less than 0.27, more preferably not less than 0.29. If less than 0.27, there is a possibility that wet grip performance is deteriorated.

Here, the loss tangent (tan δ) is measured with a viscoelastic spectrometer according to Japanese Industrial standards JIS K6394 under the following conditions:
initial strain: 10%
amplitude: +− %
frequency: 10 Hz
deformation: tensile
measure temperature: 0 deg. C.

As shown in FIG. 1 and FIG. 2, the tread portion 2 has a crown region Cr contacting with the ground mainly during straight running, and a pair of shoulder regions Sh contacting with the ground mainly during cornering by leaning the tire 1 at relatively large camber angles.

The crown region Cr includes the tire equator C, and contacts with the ground during straight running and during cornering by leaning at small camber angles for example at the time of changing lanes. More specifically, the crown region Cr may be defined as a region contacting with the ground when the camber angle is less than 10 degrees and/or a region centered on the tire equator C and ranging 30% the axial tread width TW.

The crown region Cr has a land ratio of not less than 98%. The land ratio can be 100%, namely, there is not groove in the crown region Cr. Accordingly, the rigidity of the crown region Cr is maintained at its maximum, and the shearing force in the ground contacting surface 2s of the tread portion 2 can be improved. Therefore, the cornering force during cornering by leaning at small camber angles can be improved.

In the present embodiment, as the land ratio of the crown region Cr is limited within the above-mentioned range, the tire 1 becomes hard to be affected by undulation of the road surfaces when the camber angle is small, and thereby, the behavior of the tire 1 is stabilized.

Further, in the three-wheeled vehicle on the single rear wheel of which the tire 1 is mounted, as the behavior of the rear wheel during cornering by leaning at small camber angles is stabilized, the behavior of the vehicle becomes stable.

The crown region Cr is provided with at least one crown slot 10 extending straight in parallel with the tire circumferential direction. In this example, a plurality of crown slots 10 are arranged at intervals in the tire circumferential direction.

It is preferable that each crown slot 10 is disposed on the tire equator C. The crown slot 10 can be used to check the amount of wear of the tread in the crown region Cr where the amount of wear may be largest.

The axial width W1 of the crown slot 10 is preferably 2% to 5% of the tread width TW. If less than 2%, there is a possibility that a necessary space for checking the amount of wear can not be secured. If more than 5%, there is a possibility that the land ratio of the crown region Cr is decreased, and the rigidity of the crown region Cr is decreased.

The circumferential length L1 of the crown slot 10 is preferably 4 to 7 times the axial width W1 as shown in FIG. 2.

As shown in FIG. 1, the depth D1 in the tire radial direction of the crown slot 10 is preferably 0.3 to 0.9 times the axial width W1. Such crown slot 10 can satisfy both of the size required for determining the amount of wear and the rigidity of the crown region Cr.

The cross-sectional shape of the crown slot 10 is almost an arc in the example shown in FIG. 1. However, it may be a rectangle, a trapezoid, a truncated triangular etc. alone or in combination.

It is preferable that at least one, in this example, two wear indicators 10A are, as shown in FIG. 2, disposed in at least one crown slot 10 formed in the crown region Cr which likely wears faster than the shoulder regions Sh.

The shoulder region Sh on each side of the crown region Cr is a region contacting with the ground during cornering by leaning at the camber angle of not less than 10 degrees.

The land ratio of the shoulder region Sh is preferably 85% to 93%, more preferably 89% to 91%. If less than 85%, there is a possibility that the cornering force during cornering is decreased.

If more than 91%, there is a possibility that slide controllability in the event of tire slide during cornering is deteriorated.

In the present embodiment, as the land ratio of the shoulder regions Sh is limited within the above-mentioned range, it is possible to achieve both of the cornering force during cornering and the slide controllability in good balance. Therefore, the behavior of the tire 1 in the present embodiment during cornering becomes stable.

Further, in the three-wheeled vehicle on the single rear wheel of which the tire 1 is mounted, the behavior of the rear wheel during cornering becomes stable, and as a result, the behavior of the vehicle becomes stable.

In the present embodiment, each shoulder region Sh is provided with a plurality of shoulder oblique grooves 11 disposed at intervals in the tire circumferential direction. The shoulder oblique grooves 11 include first shoulder oblique grooves 11A, second shoulder oblique grooves 11B, third shoulder oblique grooves 11C and fourth shoulder oblique grooves 11D. The configurations of the shoulder oblique grooves 11 may be arbitrarily-defined.

While detailed description has been made of an especially preferable embodiment of the present invention, the present invention can be embodied in various forms without being limited to the illustrated embodiment.

Comparison Tests

Based on the tread pattern shown in FIG. 2, test tires having the internal structure shown in FIG. 1 and specifications listed in Table 1 were experimentally manufactured. Each test tire was mounted on the rear wheel of a test vehicle, and performances of the vehicle was tested.

Common specifications are as follows:
Test vehicle: rear wheel steering type three-wheeled vehicle
 front wheel tire size: 80/90-16
 front wheel rim size: 2.15×16
 rear wheel tire size: 120/90-10
 rear wheel rim size: 3.50×10
Test Tires
 tire pressure: 225 kPa
 radius TR of curvature: 60% of tread width TW <Lane Change Performance>

During running straight in a test course whose road surface has a wheel rut (maximum depth 2 cm), the test vehicle changed lanes across the wheel rut, and the test driver evaluated controllability at that time. The results are indicated in Table 1 by an index based on comparative example 1 being 100, wherein the larger value is better.

<Wet Performance>

The test vehicle was run on a wet road surface of a test course, and the test driver comprehensively evaluated wet performance from slide controllability and road grip. The results are indicated in Table 1 by an index based on comparative example 1 being 100, wherein the larger value is better.

<Cornering Performance>

In a test course, the test vehicle was run along a 50 meter radius circle, and the test driver evaluated controllability at that time. The results are indicated in Table 1 by an index based on comparative example 1 being 100, wherein the larger value is better.

<Cornering Wear Performance>

After the test vehicle was run along the 50 meter radius circle 50 laps at a speed of 30 km, the amount of tread wear was measured in the vicinity of the tire equator. The results are indicated in Table 1 by an index based on comparative example 1 being 100, wherein the larger value is better.

TABLE 1

| Tire | Ref. 1 | Ref. 2 | Ref. 3 | Ref. 4 | Ex. 1 | Ex. 2 |
|---|---|---|---|---|---|---|
| land ratio (%) | | | | | | |
| crown region | 92 | 92 | 98 | 98 | 98 | 98 |
| shoulder region | 90 | 90 | 98 | 80 | 90 | 90 |
| tread rubber tan δ at 0 deg. C. | 0.21 | 0.3 | 0.3 | 0.3 | 0.3 | 0.21 |
| lane change performance | 100 | 87 | 100 | 100 | 100 | 113 |
| wet performance | 100 | 120 | 84 | 123 | 120 | 100 |
| cornering performance | 100 | 103 | 112 | 93 | 108 | 105 |
| cornering wear performance | 100 | 103 | 108 | 91 | 108 | 105 |

From the test results, it was confirmed that, according to the present invention, the lane change performance, wet performance, cornering performance and cornering wear performance can be improved in good balance.

REFERENCE SIGNS LIST 1 tire
2 tread portion
Cr crown region
Sh shoulder region

The invention claimed is:

1. A tire comprising: a tread portion provided with a tread profile which is curved in an arcuate shape in a tire meridian section so that the tread portion comprises a crown region contacting with the ground during straight running, and a pair of shoulder regions contacting with the ground during cornering by leaning the tire at a certain camber angle, wherein
the crown region is defined as being centered on a tire equator and ranging 30% of an axial width between tread edges of the tread portion, and the shoulder regions are defined as extending from the respective tread edges to the crown region,
the crown region is provided with at least one crown slot disposed on the tire equator and extending straight discontinuously along the tire circumferential direction so that the crown region has a land ratio of not less than 98%,
the shoulder regions have a land ratio of from 85% to 93% and
an axial width W1 of said at least one crown slot is 2% to 5% of a tread width of the tread portion.

2. The tire according to claim 1, wherein
in a tire meridian section, the tread profile has a radius of curvature of from 45% to 65% of the tread width of the tread portion.

3. The tire according to claim 2, wherein
a tread rubber disposed in the tread portion to define the ground contacting surface thereof has a loss tangent not less than 0.27 at a temperature of 0 deg. C.

4. A three-wheeled vehicle having a pair of front wheels and a single rear wheel to be leant during cornering, wherein the tire according to claim 2 is mounted on the rear wheel.

5. The tire according to claim 1, wherein
each of the shoulder regions is a region contacting with the ground during cornering when the camber angle is 10 degrees or more.

6. The tire according to claim 5, wherein
a tread rubber disposed in the tread portion to define the ground contacting surface thereof has a loss tangent not less than 0.27 at a temperature of 0 deg. C.

7. A three-wheeled vehicle having a pair of front wheels and a single rear wheel to be leant during cornering, wherein the tire according to claim 5 is mounted on the rear wheel.

8. The tire according to claim 1, wherein
a tread rubber disposed in the tread portion to define the ground contacting surface thereof has a loss tangent not less than 0.27 at a temperature of 0 deg. C.

9. A three-wheeled vehicle having a pair of front wheels and a single rear wheel to be leant during cornering, wherein the tire according to claim 8 is mounted on the rear wheel.

10. The tire according to claim 1, wherein
said at least one crown slot is provided therein with a tread wear indicator.

11. A three-wheeled vehicle having a pair of front wheels and a single rear wheel to be leant during cornering, wherein the tire according to claim 1 is mounted on the rear wheel.

12. The tire according to claim 1, wherein the crown region is provided with only said at least one crown slot.

13. The tire according to claim 12, wherein said at least one crown slot is a plurality of the crown slots arranged at intervals in the tire circumferential direction.

14. A three-wheeled vehicle having a pair of front wheels and a single rear wheel to be leant during cornering, wherein the tire according to claim 13 is mounted on the rear wheel.

15. A three-wheeled vehicle having a pair of front wheels and a single rear wheel to be leant during cornering, wherein the tire according to claim 12 is mounted on the rear wheel.

16. The tire according to claim 1, wherein the circumferential length of the crown slot is 4 to 7 times the axial width W1.

17. The tire according to claim 16, wherein the depth in the tire radial direction of the crown slot is 0.3 to 0.9 times the axial width W1.

18. A three-wheeled vehicle having a pair of front wheels and a single rear wheel to be leant during cornering, wherein the tire according to claim 16 is mounted on the rear wheel.

* * * * *